Patented Aug. 15, 1944

2,356,060

UNITED STATES PATENT OFFICE 2,356,060

ANTHRAQUINONE VAT DYESTUFFS

Francis Irving and Henry Alfred Piggott, Blackley, Manchester, England, assignors to Imperial Chemical Industries Limited, a corporation of Great Britain No Drawing. Application May 19, 1942, Serial No. 443,650. In Great Britain May 27, 1941

3 Claims. (Cl. 260—372)

This invention relates to the manufacture and application of new anthraquinone vat dyes.

These dyes are 1:4-di-(p-alkylsulphonylbenzoylamino)-anthraquinones and 1-benzoylamino-4-p-alkylsulphonylbenzoyl amino-anthraquinones in which the alkyl group or groups have not more than 4 carbon atoms and may be normal or iso.

It has already been proposed to obtain dyestuffs, which yield on cotton bright scarlet to red dyeings, by introducing into the 1- and 4-positions of the anthraquinone molecule two aroylamino groups, at least one being a m-alkylsulphonylbenzoylamino group.

We have now found that dyestuffs with similar excellent properties to those of the prior proposal, but with a superior colour value, are obtained by introducing into the 1- and 4-positions of the anthraquinone molecule two aroylamino groups, at least one being a p-alkylsulphonyl-benzoylamino group in which the alkyl group has not more than 4 carbon atoms.

According to the present invention new anthraquinone vat dyestuffs are manufactured by introducing into the 1- and 4-positions of the anthraquinone molecule two aroylamino groups, at least one being a p-alkylsulphonyl-benzoylamino group, in which the alkyl group has not more than 4 carbon atoms and may be normal or iso.

The dyestuffs may be made by diacylating 1:4-diaminoanthraquinone with a p-alkylsulphonyl-benzoyl halide or with a p-alkylsulphonylbenz-amide in the present of hydrogen chloride, or by acylating 1-amino-4-benzoylaminoanthraquinone with a p-alkylsulphonylbenzoyl halide or with a p-alkylsulphonylbenzamide in the presence of hydrogen chloride. Alternatively, the diacyl or monoacyl compounds may be obtained by interacting 1:4-dihalogeno- or 1-halogeno-4-benzoylaminoanthraquinone with a p-alkylsulphonylbenzamide.

The vat dyestuffs of the present invention dye cotton in very bright red shades of good fastness properties, and they have an excellent colour value.

The following examples, in which the parts are by weight, illustrate but do not limit the invention.

Example 1

To a nitrobenzene solution containing p-methylsulphonylbenzoylchloride, and made by heating together 26 parts of p-methylsulphonylbenzoic acid, 280 parts of nitrobenzene, and 28 parts of thionyl chloride at 100° C., with stirring under a reflux condenser until complete solution is attained, and then removing excess thionyl chloride by distilling it from the solution at 150° C., there are added at 150° C. 16 parts of 1:4-diaminoanthraquinone. The mixture is stirred and heated at the boil for 1½ hours. After cooling, the separated material is filtered off and heated under boiling water in a current of steam until free from nitrobenzene. The resulting dyestuff dissolves in concentrated sulphuric acid with a red-brown colour and dyes cotton from a bluish-grey alkaline hydrosulphite vat in bright scarlet shades of very good all round fastness.

p-methylsulphonyl benzoic acid is prepared by oxidising p-methylmercaptobenzoic acid with hydrogen peroxide in glacial acetic acid. It crystallises from water in colourless needles, M. P. 264–5° C.

Example 2

14 parts of p-methylsulphonyl benzoic acid are converted to the corresponding acid chloride as in Example 1. After removing the excess thionyl chloride, 17 parts of 1-amino-4-benzoylamino-anthraquinone are added and the temperature is raised to 200–210° C. and maintained there for 1½ hours. The product which separates on cooling is isolated as described in Example 1 and dyes cotton in red shades considerably bluer than those given by the product of that example.

Example 3

30 parts of p-iso-propylsulphonylbenzoic acid are converted to chloride and condensed with 1:4-diaminoanthraquinone as described in Example 1. There is thus obtained a bright scarlet dyestuff with properties similar to those of the product of Example 1.

The corresponding product from p-iso-propyl-sulphonylbenzoic acid and 1-amino-4-benzoyl-aminoanthraquinone, prepared by the method of Example 2, is very similar in shade and dyeing properties.

p-iso-propylsulphonylbenzoic acid, M. P. 193° C., is prepared by oxidising p-tolyl-iso-propyl sulphone (obtained from sodium p-toluene sulphinate and iso-propyl bromide) with potassium permanganate in neutral solution in presence of magnesium sulphate.

Example 4

16 parts of p-n-butylsulphonylbenzamide, 7 parts of 1:4-diaminoanthraquinone and 100 parts of nitrobenzene are stirred at 200–210° C. while a stream of hydrochloric acid gas is bubbled through the mixture for 3 hours. After cooling, the separated material is filtered off and washed with hot ethanol until free from nitrobenzene and p-n-butylsulphonylbenzamide. The product is identical with that obtained by condensing p-n-butylsulphonylbenzoyl chloride with 1:4-diaminoanthraquinone by the method described in Example 1.

p-n-butylsulphonylbenzamide, M. P. 173° C. is prepared by adding p-butylsulphonylbenzoyl chloride slowly to concentrated aqueous ammonia.

Similar dyestuffs to those described above are obtained from the appropriate derivatives, namely, the chloride or the amide, of p-ethylsulphonyl benzoic acid (obtained by oxidising p-tolyl ethyl sulphone with alkaline potassium permanganate), M. P. 219° C. and p-n-propylsulphonyl benzoic acid (obtained similarly from p-tolyl n-propyl sulphone), M. P. 198° C., using methods similar to those described above.

We claim:

1. 1-amino-4(p-alkylsulphonylbenzoylamino)-anthraquinone in which one hydrogen of the 1-amino group is replaced by one of the radicals of the group consisting of benzoyl and p-alkylsulphonylbenzoyl groups in which the alkyl radical contains not more than 4 carbon atoms.

2. 1:4-di-(p-alkylsulphonylbenzoylamino)-anthraquinones in which the alkyl groups contain not more than 4 carbon atoms.

3. 1-benzoylamino-4-p-alkylsulphonylbenzoylamino anthraquinones in which the alkyl group contains not more than 4 carbon atoms.

FRANCIS IRVING.
HENRY ALFRED PIGGOTT.